United States Patent
Kitajima (10) Patent No.: US 9,292,932 B2
(45) Date of Patent: Mar. 22, 2016

(54) THREE DIMENSION MEASUREMENT METHOD, THREE DIMENSION MEASUREMENT PROGRAM AND ROBOT DEVICE

(71) Applicant: CANON KABUSHIKI KAISHA, Tokyo (JP)

(72) Inventor: Hiroshi Kitajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 14/355,685

(22) PCT Filed: Nov. 29, 2012

(86) PCT No.: PCT/JP2012/081589
§ 371 (c)(1),
(2) Date: May 1, 2014

(87) PCT Pub. No.: WO2013/094420
PCT Pub. Date: Jun. 27, 2013

(65) Prior Publication Data
US 2014/0294286 A1    Oct. 2, 2014

(30) Foreign Application Priority Data
Dec. 22, 2011 (JP) ................. 2011-281150

(51) Int. Cl.
*G06T 7/00* (2006.01)
(52) U.S. Cl.
CPC ............. *G06T 7/0085* (2013.01); *G06T 7/0044* (2013.01); *G06T 7/0097* (2013.01); *G06T 2207/10012* (2013.01); *G06T 2207/30108* (2013.01); *Y10S 901/47* (2013.01)
(58) Field of Classification Search
None
See application file for complete search history.

(56) References Cited

U.S. PATENT DOCUMENTS 9,131,222 B2    9/2015    Hayasaka et al.
2010/0232647 A1   9/2010    Fujieda et al.
(Continued)

FOREIGN PATENT DOCUMENTS

CN    102164293 A    8/2011
JP    05-005609 A    1/1993
(Continued)

OTHER PUBLICATIONS

Jul. 3, 2014 Notification Concerning Transmittal of International Preliminary Report concerning International Application PCT/JP2012/081589.
(Continued)

*Primary Examiner* — Siamak Harandi
(74) *Attorney, Agent, or Firm* — Fitzpatrick, Cella, Harper & Scinto (57) ABSTRACT

A three-dimensional measurement method three-dimensionally restores an edge having a cross angle close to parallel to an epipolar line. Edges $e_{2L}$, $e_{3L}$ and $e_{4L}$ on the same plane of a work are selected, and among these edges, at least two edges $e_{2L}$ and $e_{4L}$ residing in a predetermined angle range with reference to the cross angle of 90° crossing the epipolar line are three-dimensionally restored by a stereo method. Then, a three-dimensional plane $P_1$ including these three-dimensionally restored $e_{2L}$ and $e_{4L}$ is found, and the edge $e_{3L}$ residing beyond a predetermined angle range with reference to the cross angle of 90° crossing the epipolar line is projected to this three-dimensional plane $P_1$, thus three-dimensionally restoring the edge $e_{3L}$.

7 Claims, 8 Drawing Sheets

(56) References Cited

U.S. PATENT DOCUMENTS

| | | | |
|---|---|---|---|
| 2011/0199458 A1 | 8/2011 | Hayasaka et al. | |
| 2011/0235897 A1* | 9/2011 | Watanabe | G06K 9/00214 382/154 |
| 2012/0320152 A1* | 12/2012 | Seok | G06T 7/0075 348/42 |
| 2015/0332468 A1 | 11/2015 | Hayasaka et al. | |

FOREIGN PATENT DOCUMENTS

| | | |
|---|---|---|
| JP | 2882910 B2 | 2/1999 |
| JP | H11-155151 A | 6/1999 |

OTHER PUBLICATIONS

Belhaoua, A., et al., "Estimation of 3D reconstruction errors in a stereo-vision system", Modeling Aspects in Optical Metrology II, Holography and Oct, Proc. SPIE 7390, vol. 7390, Jun. 15, 2009, pp. 1-10.

International Search Report and Written Opinion issued in International Application No. PCT/JP2012/081589 dated Mar. 25, 2013.

Huang, Jin et al., "Three dimension measurement method based on image processing", Electronic Devices, Dec. 31, 2002, vol. 25, No. 4, pp. 364-368.

Dec. 9, 2015 Chinese Office Action corresponding to Chinese Patent Application No. 201280062326.6.

* cited by examiner

FIG. 10B

THREE DIMENSION MEASUREMENT METHOD, THREE DIMENSION MEASUREMENT PROGRAM AND ROBOT DEVICE

TECHNICAL FIELD

The present invention relates to three dimension measurement of a work based on a taken image.

BACKGROUND ART

In general, a method called a stereo method is widely known as a method of taking an image of a measurement target (hereinafter simply called a work) by a camera and finding coordinates of a three-dimensional point of the work based on the taken image. This stereo method is to measure a three-dimensional position using a parallax of a camera. Firstly between images taken by two cameras with different points of view are find corresponding points of a point to be measured about a three-dimensional position. Then, the three-dimensional position is calculated based on the principle of triangulation using the positional relations among the corresponding points on these images and the positions of the cameras.

Such a stereo method is widely used for three-dimensional measurement techniques used for product examination or for recognition of a work by an industrial robot, for example, and is used to calculate the formula of a three-dimensional straight line of a linear edge (linear portion) of the work, for example.

That is, in the case where design data on a work is known, when two or more of the three-dimensional formulae of straight-lines of the linear edges of the work are calculated so as to decide the posture of the work, then a three-dimensional position of the work can be found from the design data or the like in principle. Then, these three-dimensional formulae of straight-lines of the linear portions are calculated using three-dimensional positions of two or more points on the linear portions, and the above stereo method is used to calculate the positions of the points on the linear portions.

Unlike the case of finding the three-dimensional position of a point-like object, however, in the case of one point on a straight line of an image taken by one camera, it is difficult to specify a point corresponding to the one point on a straight line of an image taken by the other camera.

Then, in order to detect a corresponding point of the linear portion in each image plane, it is known to use a virtual reference line called an epipolar line. This epipolar line is obtained by projecting a line of sight about an object (e.g., one point on a linear portion of a work) viewed by one of the cameras onto an image taken by the other camera, and the corresponding point to be found can be said to reside on this epipolar line. Accordingly, in order to specify, as for one point on a linear portion on one image, a corresponding point on the other image, an epipolar line may be drawn on the other image and a cross point of the epipolar line with the linear portion of the other image can be made the corresponding point.

This epipolar line, however, is projected onto an image plane as a straight line where a plane (an epipolar plane) including the points of view of two cameras and a point on the work crosses each image plane, and therefore the gradient thereof will be uniquely decided by the positional relation between the two cameras. As a result, in the case of a linear portion having the gradient parallel to this epipolar line, a corresponding point cannot be specified because the epipolar line and the linear portion overlap.

Further when the cross angle between the epipolar line and the linear portion is close to parallel on the image, influences of the detection error of the corresponding point becomes significant compared with an error of the detection of the liner portion on the image, and so there is a possibility to decrease in measurement accuracy, especially in measurement accuracy in the depth direction.

Then, conventionally proposed is a technique of using an operator to extract a linear portion having a cross angle close to a right angle with respect to the epipolar line, thus extracting only a linear portion having a sufficient relative angle with respect to the epipolar line (see PTL 1).

CITATION LIST

Patent Literature

PTL 1: Japanese Patent Application Laid-Open No. H05 (1993)-5609

SUMMARY OF INVENTION

Technical Problem

Figure 10A:
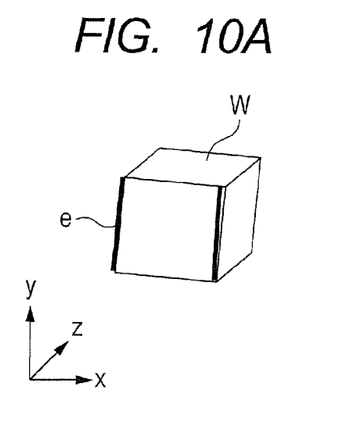
FIG. 10A shows the case where an edge can be extracted to an edge point of a side of the work and FIG. 10B shows the case where an edge cannot be extracted to an edge point of a side of the work.

In this way, to extract only a linear portion having a cross angle close to a right angle with respect to the epipolar line allows a corresponding point between images to be found. As a result, as shown in FIG. 10A, when an edge can be extracted precisely from an end to the other end of a side (linear portion) L of the actual work, the work can be precisely restored three-dimensionally as long as two or more similar edges can be extracted.

Figure 10B:
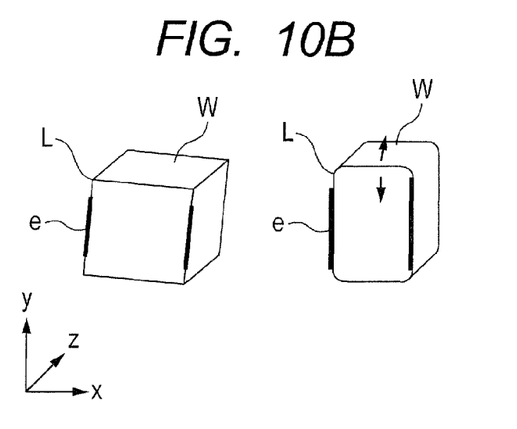

Actually, however, as shown in FIG. 10B, it may be difficult to strictly extract an edge to the end of the linear portion S from the taken image because of problems such as the contrast of the image and the shape of the work, e.g., the corner of the work being a curve.

In this case, in order to measure a three-dimensional position of the work, it is necessary to find a cross point between a formula of a three-dimensional straight line of a linear portion having a cross angle close to parallel to the epipolar line and a formula of a three-dimensional straight line of a linear portion having a cross angle close to a right angle to the epipolar line, so as to calculate the end point.

Then, it is an object of the present invention to provide a three-dimensional measurement method, a three-dimensional measurement program and a robot device capable of three-dimensionally restoring an edge having a cross angle close to parallel to an epipolar line.

Solution to Problem

Three-dimensional measurement method according to the present invention includes the steps of: acquiring, by an arithmetic unit, a stereo image of a work taken by first and second cameras; extracting, by the arithmetic unit, edges from the acquired stereo image; selecting, by the arithmetic unit, edges existing on a same plane of the work from the edges extracted on the stereo image; three-dimensionally restoring, by the arithmetic unit, at least two first edges among the edges existing on the same plane by a stereo method, the first edges residing in a predetermined angle range with reference to a cross angle of 90° made by crossing with an epipolar line; calculating, by the arithmetic unit, a three-dimensional plane including the three-dimensionally restored first edges using the three-dimensionally restored at least two first edges; and three-dimensionally restoring, by the arithmetic unit, a second edge among the edges existing on the same plane as the first edges by projecting the second edge on the three-dimensional plane, the second edge residing beyond a predetermined angle range with reference to a cross angle of 90° made by crossing with an epipolar line.

A robot device according to the present invention includes: first and second cameras that take an image of a work; a robot arm that performs an operation to the work; and an arithmetic unit that recognizes a three-dimensional position of the work based on the stereo image of the work taken by the first and the second cameras and gives a driving instruction to the robot arm. The arithmetic unit extracts edges from the acquired stereo image, selects edges existing on a same plane of the work from the extracted edges, three-dimensionally restores at least two first edges among the edges existing on the same plane by a stereo method, the first edges residing in a predetermined angle range with reference to a cross angle of 90° made by crossing with an epipolar line, three-dimensionally restores a second edge by projecting the second edge on a three-dimensional plane including the three-dimensionally restored first edges, the second edge residing beyond a predetermined angle range with reference to a cross angle of 90° made by crossing with an epipolar line, and recognizes a three-dimensional position of the work using the three-dimensionally restored first and second edges.

Advantageous Effects of Invention

According to the present invention, at least two edges on the same plane and residing in a predetermined angle range with reference to the cross angle of 90° crossing the epipolar line are three-dimensionally restored by a stereo method. Then, a three-dimensional plane including these three-dimensionally restored first edges is found. As long as an edge exists on the same plane as these three-dimensionally restored first edges, even in the case of an edge close to parallel to the epipolar line, such an edge can be precisely three-dimensionally restored by projecting the edge on the found three-dimensional plane.

Further features of the present invention will become apparent from the following description of exemplary embodiments with reference to the attached drawings.

BRIEF DESCRIPTION OF DRAWINGS

FIGS. 10A and 10B show a relation between a three-dimensional work and edges extracted from an image of the work, where

DESCRIPTION OF EMBODIMENTS

The following describes three-dimensional measurement of a work according to one embodiment of the present invention. In the following description, an edge refers to a part of an image taken having an abrupt change in contrast. Three-dimensional restoring refers to restore a three-dimensional position of a target object from a two-dimensional image. Further in the following drawings, the three-dimensional coordinate system has an origin at an optical center O1 of a left camera, X-axis in the direction directed from the origin to an optical center O2 of a right camera, Z-axis in the perpendicular direction from the origin O1 to a left image and Y-axis perpendicular to X and Z axes.

(Structure of Robot Device)

Figure 1:
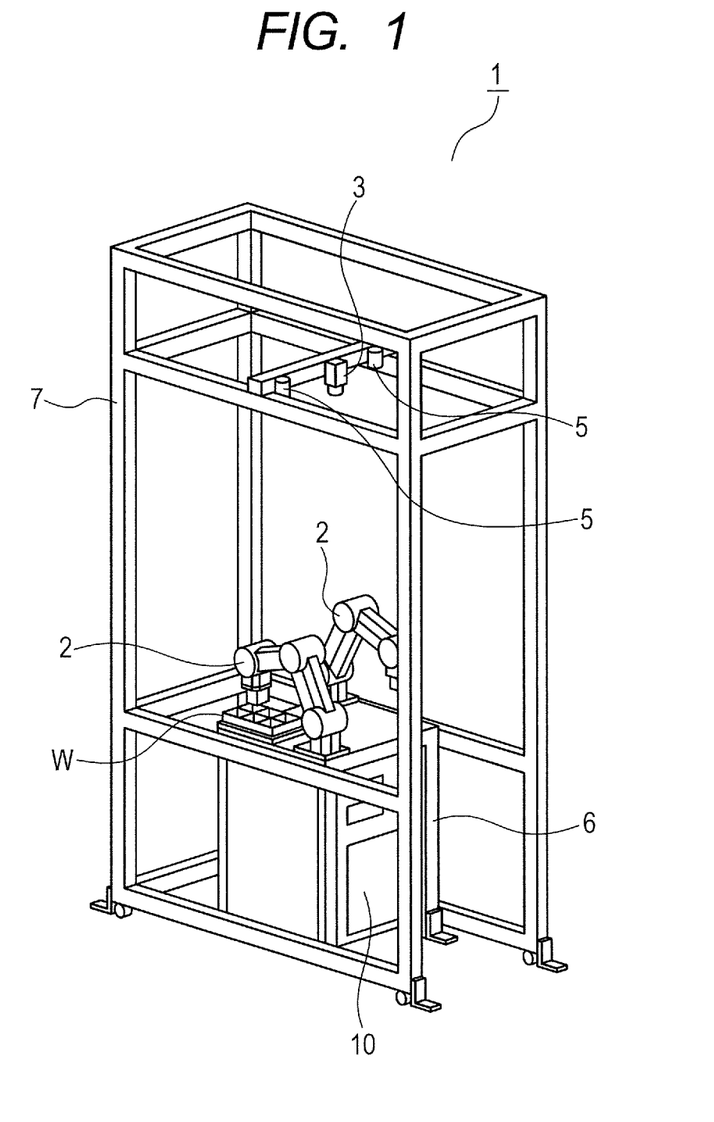
FIG. 1 schematically shows a robot device according to one embodiment of the present invention.

As shown in FIG. 1, a robot device 1 according to the present embodiment is an assembled robot that is a so-called robot cell, including the combination of a plurality of robots to configure a series of production line. This robot device 1 includes a robot arm 2 performing assembly or the like of a work W provided inside a frame-form booth 7, and at an upper part of the booth 7 are attached a camera 3 and a lighting fixture 5 to take an image of the work from the above of the robot arm 2.

Inside a base 6 supporting the robot arm 2 is provided a robot controller (control device) 10 configured to recognize a three-dimensional position of the work W based on an image taken by the camera 3 and give a driving instruction to the robot arm 2. The robot device 1 basically includes these robot arm 2, camera 3 and robot controller 10, and is configured to recognize the work W based on an image taken by the camera 3 and perform an operation such as assembly by grasping the work W with the robot arm 2.

Figure 2:
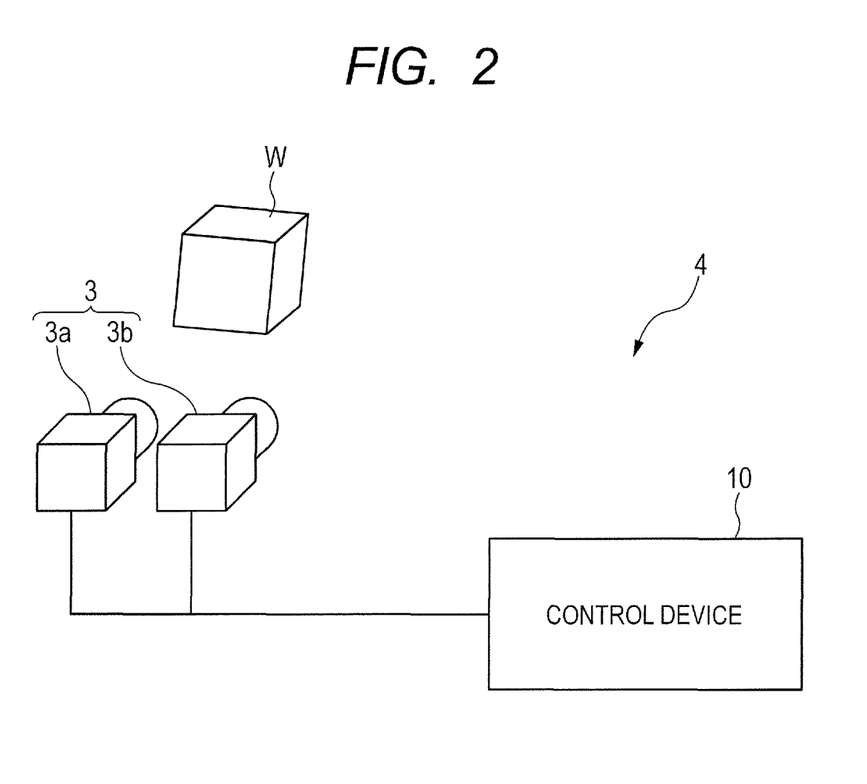
FIG. 2 schematically shows a relation between the cameras and the robot controller of the robot device of FIG. 1.

In this way, the robot device 1 configures a three-dimensional measurement device 4 that recognizes a three-dimensional position of the work W using the camera 3 and the robot controller 10, and FIG. 2 schematically shows this three-dimensional measurement device 4. As shown in FIG. 2, the camera 3 includes a stereo camera made up of first and second cameras 3a and 3b whose camera parameters are calibrated, and recognizes a three-dimensional position of the work W by the aforementioned stereo method.

Figure 3:
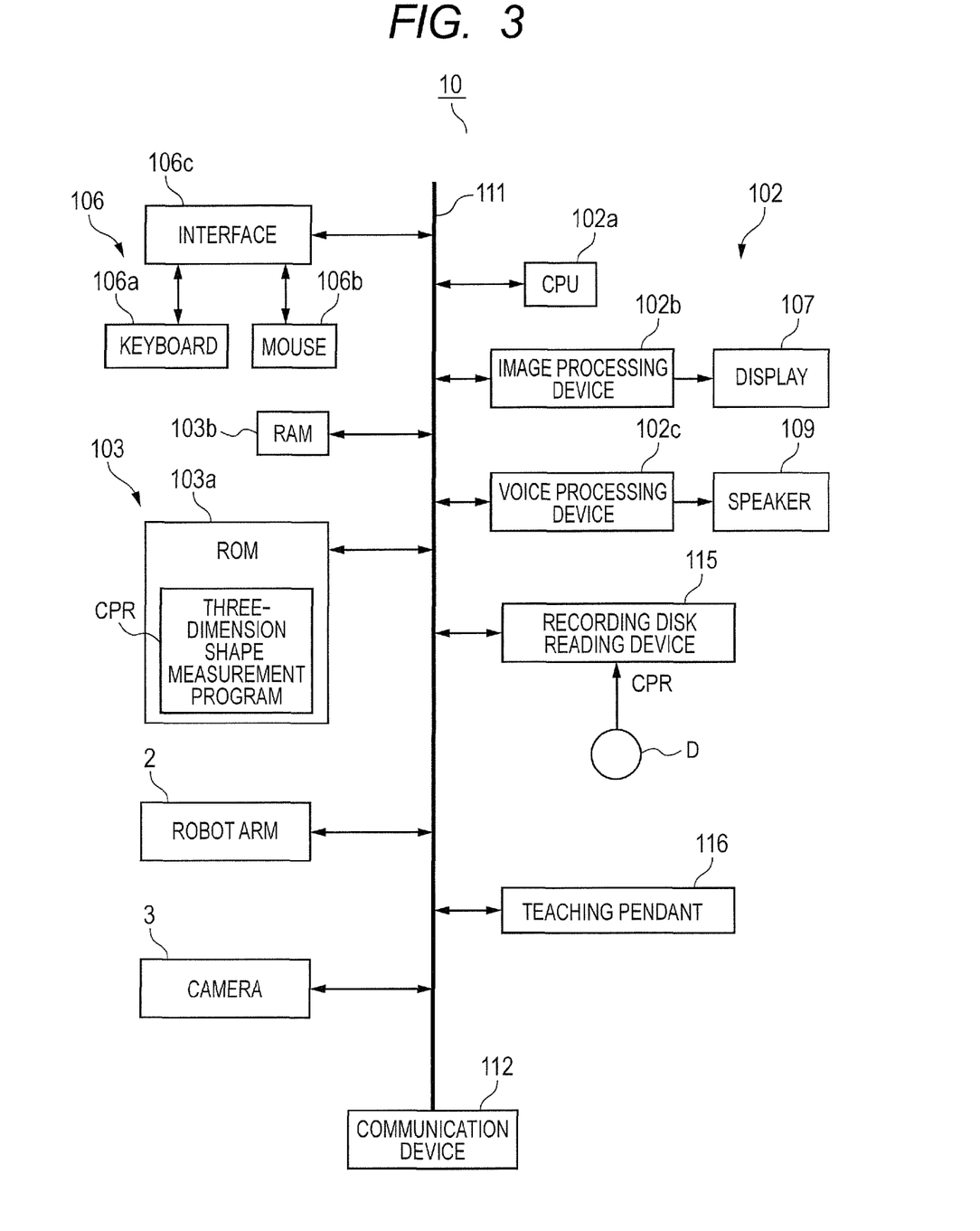
FIG. 3 schematically shows the configuration of the robot controller of FIG. 1.

As shown in FIG. 3, the robot controller 10 includes a computer main unit having an arithmetic unit 102 and a storage unit 103, to which the robot arm 2 and the camera 3 are connected. The arithmetic unit 102 recognizes a three-dimensional position of the work W based on a stereo image of the work taken by the first and second cameras 3a and 3b and gives a driving instruction to the robot arm 2. To the computer main unit are connected a teaching pendant 116 and an input unit 106 through which an operator performs input operations, a display unit 107 and the like.

The storage unit 103 stores design data on first and second works W1 and W2, control drivers for the robot arm 2 and the camera 3 and the like. The storage unit 103 further stores a three-dimensional measurement program CPR to make the computer (arithmetic unit 102) execute an operation to find a three-dimensional position of a target on the basis of an image taken by the camera 3, a template image $G_T$ for pattern matching and the like.

More specifically, the computer main unit mainly includes a CPU 102a as well as an image processing device 102b and a voice processing device 102c, thus configuring the arithmetic unit 102. To the CPU 102a are connected a ROM 103a and a RAM 103b via a bus 111, in addition to the image processing device 102b and voice processing device 102c. The ROM 103a stores a program necessary for basic control of the robot as well as various programs and data such as the aforementioned three-dimensional measurement program CPR. The RAM 103b keeps a working area for the CPU 102a. The image processing device 102b controls a display as the display unit 107 in accordance with a drawing instruction from the CPU 102a to display a predetermined image on the screen of the display. The voice processing device 102c generates a voice signal in accordance with a pronunciation instruction from the CPU 102a and outputs the voice signal to a speaker 109.

To the bus 111 are connected the robot arm 2 and the camera 3 as well as a recording disk reading device 115. Accordingly the three-dimensional measurement program CPR may be recorded in a recording medium D such as a recording disk or a USB memory, and the robot controller 10 can read this recording medium D and store the data in the ROM 103a, for example. The storage unit 103 includes, in addition to the ROM 103a and the RAM 103b as main storage devices, a computer readable recording medium and other external storage devices.

To the bus 111 is further connected a communication device 112. Therefore instead of using the aforementioned recording medium D, a three-dimensional measurement program CPR delivered from the Internet or the like may be downloaded via the communication device 112.

(Three-Dimensional Shape Measurement Method)

The following describes a three-dimensional measurement method of a work using the aforementioned three-dimensional measurement program. In the following description, an image taken by the first and second cameras 3a and 3b is referred to as an input image or a stereo image $G_E$, and a stereo image subjected to edge extraction is referred to as $G_{E1}$. When there is a need to distinguish each of such stereo images $G_E$, they may be referred to as in $G_{EL}$ and $G_{ER}$ by assigning letters LR for distinguishing.

Figure 4:
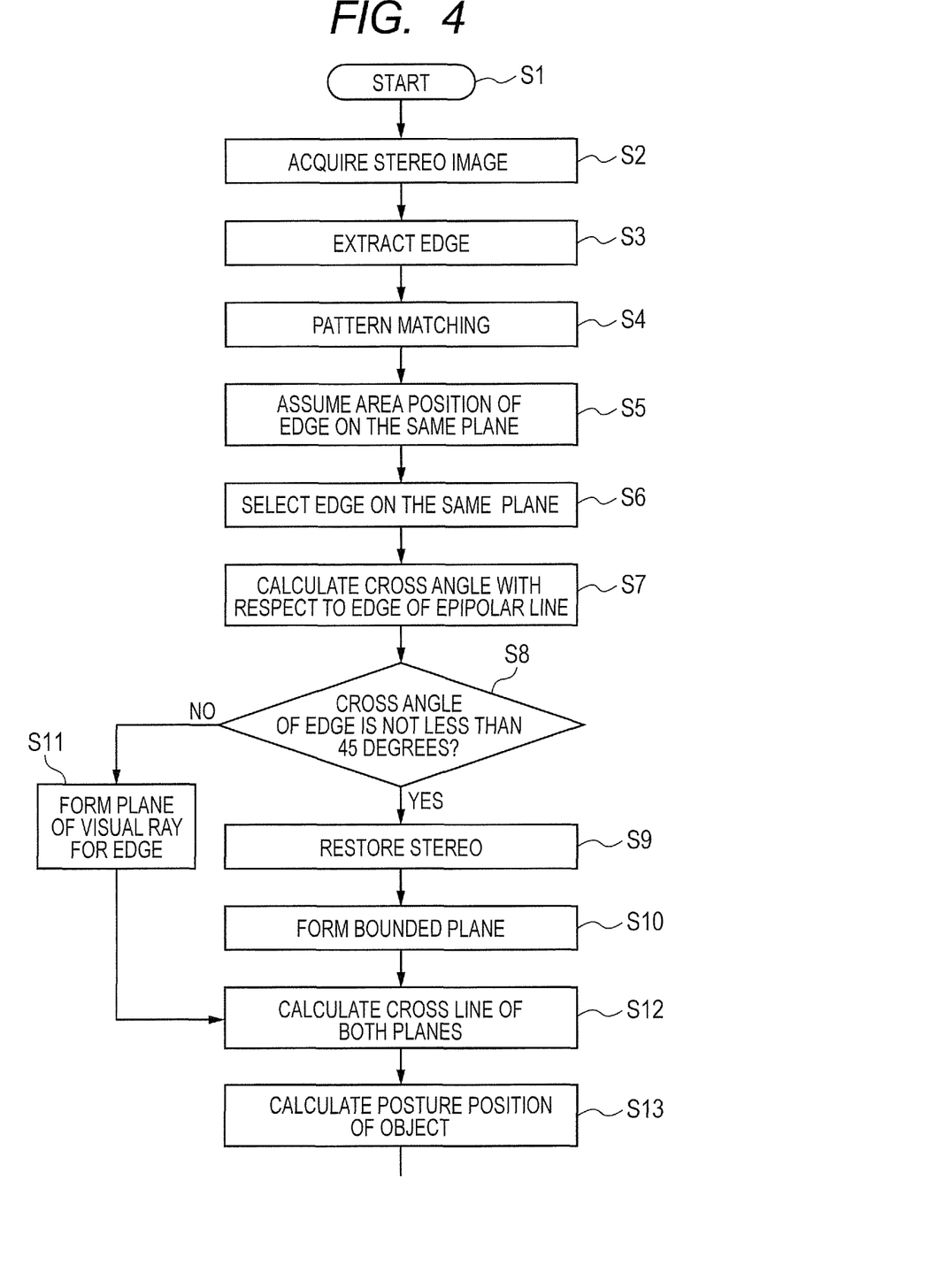
FIG. 4 is a flowchart showing a three-dimensional measurement method according to one embodiment of the present invention.

As shown in FIG. 4, when the robot device 1 starts to operate with a work W (Step S1 of FIG. 4), firstly an image of the work W as a measurement target is taken by the first and second cameras 3a and 3b, thus acquiring two input images (stereo images) $G_E$ (S2, acquisition step).

Figure 5A:
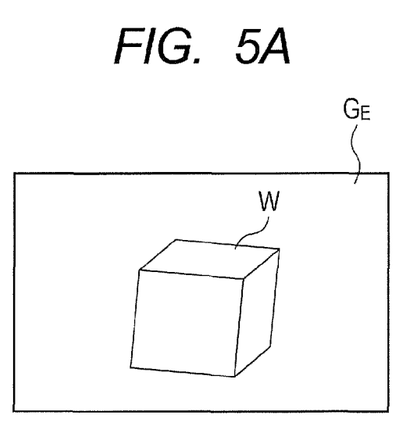
FIG. 5A shows an image of a work taken by a camera.
Figure 5B:
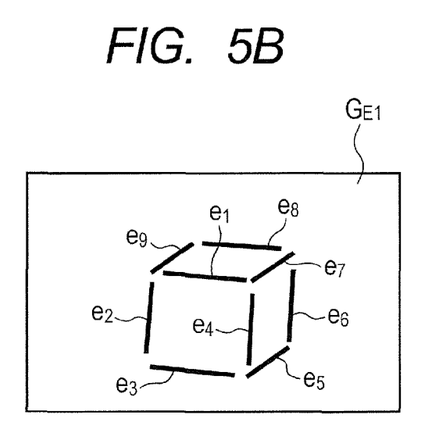
FIG. 5B shows an image obtained by performing edge extraction to the image of FIG. 5A.

Receiving the stereo image $G_E$ as an input, the arithmetic unit 102 of the robot controller 6 extracts an edge of the input stereo image $G_E$ (S3, edge extraction step). That is, filtering is performed to a stereo image $G_E$ as shown in FIG. 5A using an edge detection filter such as a Sobel filter or a Prewitt filter to detect edges $e_1$ to $e_9$ to extract the contour of the work W (see FIG. 5B).

After extraction of these edges $e_1$ to $e_9$, the arithmetic unit 102 selects edges existing on the same plane of the work W among the detected plurality of edges $e_1$ to $e_9$ (S4 to S6, same plane edge selection step).

More specifically, the robot controller 6 reads the template image $G_T$ (see FIG. 6A) for the work W stored beforehand as a reference image in the storage unit 103 and performs pattern matching for the stereo image $G_E$ using this template image $G_T$ (S4).

Figure 6A:
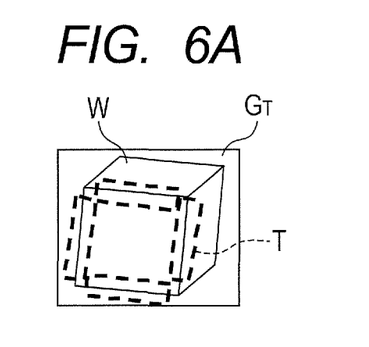
FIGS. 6A, 6B and 6C schematically show a method for pattern matching, where FIG. 6A schematically shows a template image, FIG. 6B schematically shows searching procedure and FIG. 6C schematically shows a method for selecting edges on a same plane.
Figure 6B:
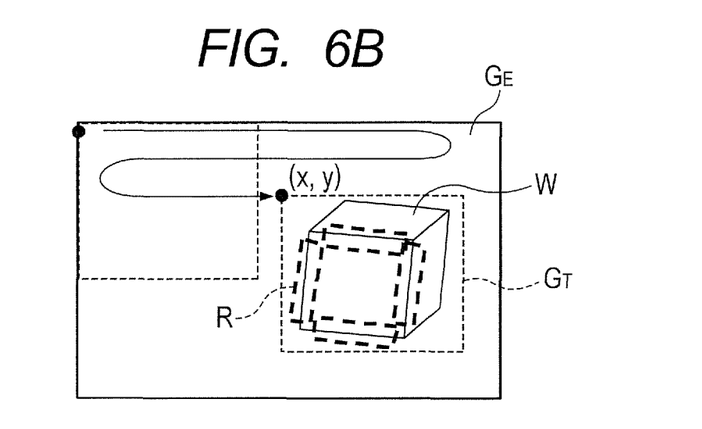

The pattern matching is a method of searching for a position of the stereo image $G_E$ similar to the template image as shown in FIG. 6B, and for instance, searches for a position of the work W on the template image $G_E$ based on brightness values in the image.

Herein, the formula indicating a normalized correlation method that is a typical method for pattern matching is described below. A correlation value herein refers to a similarity of the input image $G_E$ to the template image $G_T$.

$$\text{Correlation value } R_{ij} = \frac{\sum (f_{ij} - \bar{f}) \times (g_{ij} - \bar{g})}{\sqrt{\sum (f_{ij} - \bar{f})^2} \times \sqrt{\sum (g_{ij} - \bar{g})^2}} \quad \text{(Formula 1)}$$

(i, j): Position in input image
f: Brightness value at position (i, j) in input image
g: Brightness value at position (i, j) in template image
f̄: Average brightness value of area in image to be searched corresponding to template
ḡ: Average brightness value of template image More specifically, as shown in FIG. 6B, while the range of the template image $G_T$ is shifted by the units of pixels in the stereo image, an image corresponding to the template image $G_T$ in size is extracted from the stereo image $G_E$.

Then, a correlation value R between the extracted image and the template image is found by the above Formula 1, thus searching for a position (x, y) where the measurement target object exists from the stereo image. Herein the "position (i, j) in image" in Formula 1 represents the position in the image in size corresponding to the template image $G_T$ extracted from the stereo image $G_E$ and in the template image.

Figure 6C:
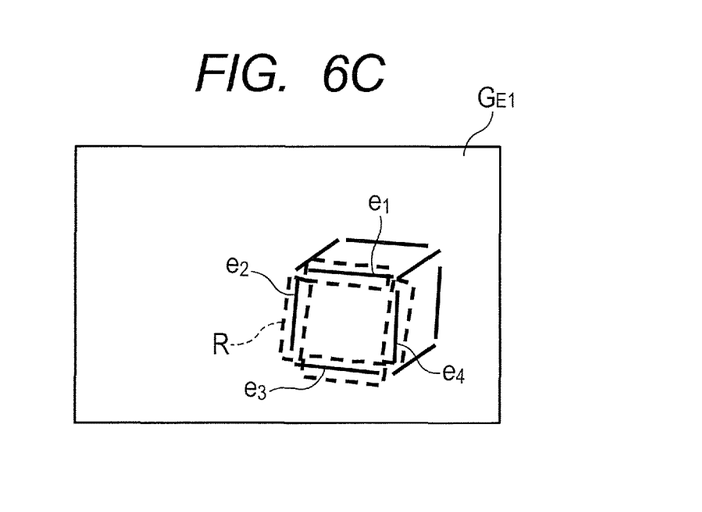

Meanwhile, the storage unit 103 stores an area where edges on the same plane of the work exist (edge area position) as in the form of a rectangular area T indicated with dotted lines of FIGS. 6A-6C, for example, when registering the template image $G_T$.

Therefore, when the position (x, y) where the work W exists can be found from the input image $G_E$, positions on the stereo image where the edges on the same plane exist are assumed based on this pattern matching result and the edge area position T (S5).

Then, when the area where the edges on the same plane exist is assumed, as shown in FIG. 6C, this edge area position R is applied to the stereo image $G_{E1}$ subjected to extraction of the edges $e_1$ to $e_9$ (edge image). Then, the edges $e_1$ to $e_4$ existing in the edge area position are selected as edges existing on the same plane (S6).

When the edges $e_1$ to $e_4$ existing on the same plane are selected, the arithmetic unit 102 detects cross angles $\theta_1$ to $\theta_4$ made by the edges $e_1$ to $e_4$, respectively, crossing the epipolar line EP (S7, cross angle detection step).

Figure 7:
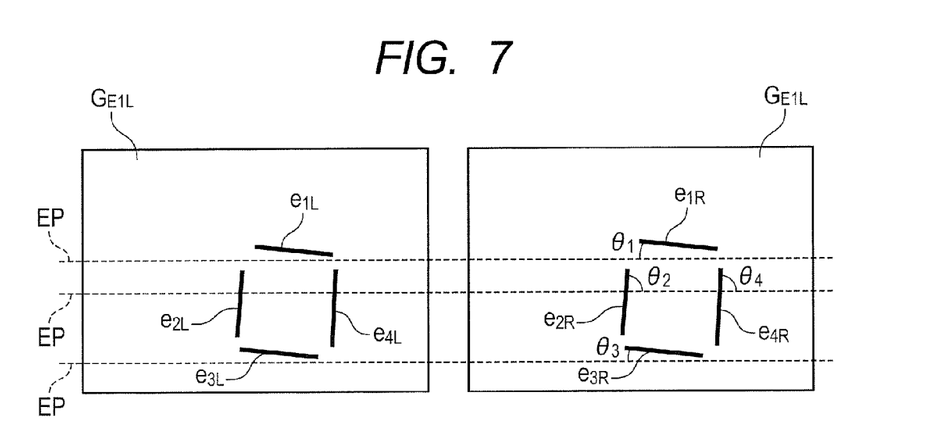
FIG. 7 shows relations of cross angles between edges and epipolar lines.

More specifically, as shown in FIG. 7, cross angles θ with the epipolar line EP are measured for at least one of the stereo images, preferably for both of the left and right stereo images.

When the cross angles $\theta_1$ to $\theta_4$ with the epipolar line EP are detected, the arithmetic unit 102 classifies the selected edges into first edges $e_2$ and $e_4$ and second edges $e_1$ and $e_3$ based on the detected cross angles $\theta_1$ to $\theta_4$ (S8, classification step).

The first edges $e_2$ and $e_4$ are edges in a predetermined angle range with reference to the cross angle 90° crossing the epipolar line EP among the edges located on the same plane, which are precisely three-dimensional restorable edges by the stereo method.

On the other hand, the second edges $e_1$ and $e_3$ are edges beyond a predetermined angle range with reference to the cross angle 90° crossing the epipolar line EP among the edges located on the same plane as the first edges $e_2$ and $e_4$, which are edges close to parallel to the epipolar line EP. In other words, these edges can be said as those which cannot be precisely three-dimensional restorable edges by the stereo method.

Herein, this range of cross angles may be decided based on the edge extraction accuracy, and in the case of the present embodiment, the range of 45° around the cross angle 90° (the range between 45° and 135°) is preferably set as a first edge. The range other than the first edge ($0 \leq \theta < 44$, $135 < \theta \leq 180$) is preferably set as a second edge.

Alternatively, when this angle range is defined as smaller angles among the angles made between the epipolar line EP and the edges $e_1$ to $e_4$, then, the edges having cross angles of 45° or more may be desirably set as first edges and edges less than 45° may be set as second edges. However, in the case where edges with cross angles of 45° or more cannot be obtained as the first edges or the edge extraction accuracy is high, for example, instead of 45°, edges with cross angles of 20° or more (i.e., cross angles are in the range of 20° to 160°) may be set as the first edges, and edges less than 20° may be set as the second edges, for example.

After the classification of edges is finished, since the first edges $e_2$ and $e_4$ can be three-dimensionally restorable precisely by the stereo method, the arithmetic unit 102 three-dimensionally restores at least two first edges (S9, first edge three-dimensional restoring step).

More specifically, any two points are selected for each of the edges $e_2$ and $e_4$ in the left image $G_{E1L}$ of FIG. 7, and corresponding points of these selected two points are specified on the right image using the epipolar line EP.

Then, three-dimensional positions of these selected two points are found using the parallax between the right image $G_{E1R}$ and $G_{E1L}$, and an Formula of a three-dimensional straight line on each edge is introduced from these found two points, whereby the edges are restored three-dimensionally.

On the other hand, the second edge $e_1$, $e_3$ cannot be three-dimensionally restored precisely by the stereo method. Accordingly in order to three-dimensionally restore these second edges $e_1$ and $e_3$, the arithmetic unit calculates a three-dimensional plane (hereinafter called a bounded plane) including the three-dimensionally restored first edges using the at least two first edges $e_2$ and $e_4$ that are three-dimensionally restored (S10, bounded plane calculation step).

Herein, a formula of a three-dimensional plane can be calculated by finding a normal vector of a plane to be found and one point on the plane. Therefore, as shown in FIG. 8, the arithmetic unit 102 firstly extracts any two points from one of the first edges that are three-dimensionally restored and any one point from another edge.

Figure 8:
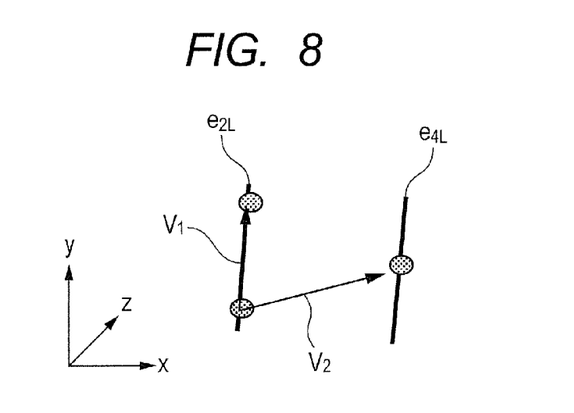
FIG. 8 schematically shows a method of creating a bounded plane.

At this time, assuming that these points have coordinates $(x1, y1, z1)$, $(x2, y2, z2)$ and $(x3, y3, z3)$, then directional vectors $V_1$ $(x4, y4, z4)$ and $V_2$ $(x5, y5, z5)$ of FIG. 8 can be found by the following Formulae 2 and 3.

$$(x4,y4,z4)=(x1-x2,y1-y2,z1-z2) \quad \text{(Formula 2)}$$

$$(x5,y5,z5)=(x3-x2,y3-y2,z3-z2) \quad \text{(Formula 3)}$$

Then, normal vector (a, b, c) of the bounded plane can be represented by Formula 4 based on these directional vectors $V_1$ $(x4, y4, z4)$ and $V_2$ $(x5, y5, z5)$.

$$(a,b,c)=(y4z5-y5z4,z4x5-z5x4,x4y5-x5y4) \quad \text{(Formula 4)}$$

Then, the bounded plane $P_1$ can be found by Formula 5 based on the normal vector (a, b, c) and the coordinates (x3, y3, z3) of any one point of the three-dimensionally restored edge.

$$ax+by+cz-(ax3+by3+cz3)=0 \quad \text{(Formula 5)}$$

Figure 9:
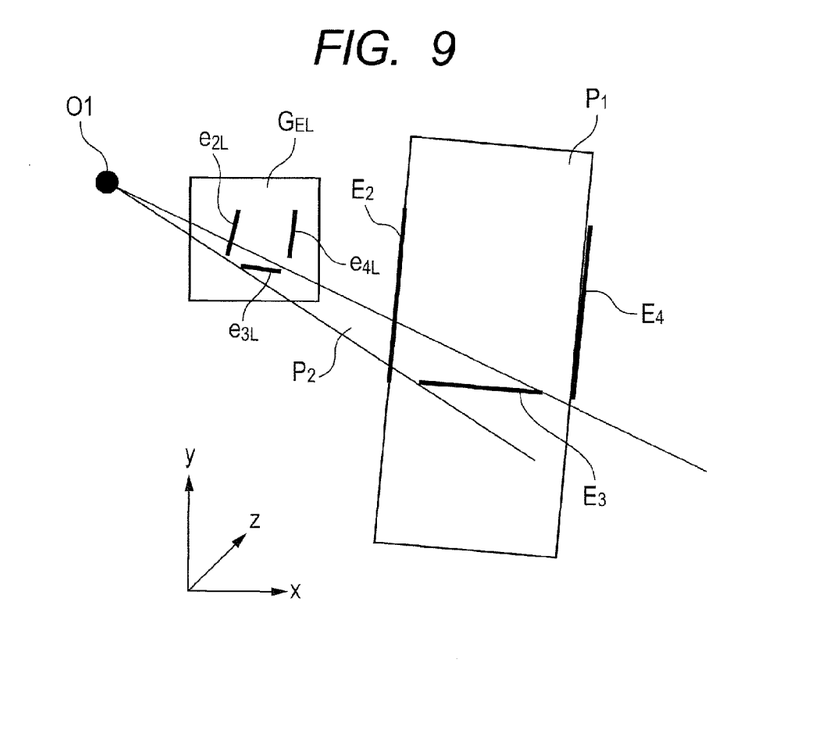
FIG. 9 schematically shows a three-dimensional restoring method of an edge close to parallel to an epipolar line.

Since the bounded plane $P_1$ is found, the arithmetic unit 102 performs three-dimensionally restoring by projecting the second edges $e_1$ and $e_3$ on this bounded plane $P_1$ (S11, S12, second edge three-dimensional restoring step). More specifically, as shown in FIG. 9, the arithmetic unit 102 forms a plane of visual ray for edge $P_2$ including two points that are the optical center $\theta_1$ of the left camera and the end point of the selected second edge $e_{3L}$ on the left image (S11).

That is, assuming edges points on the image are (Xc1, Yc1, Zc1) and (Xc2, Yc2 and Zc2), the normal vector (i, j, k) of the plane of visual ray for edge $P_2$ can be represented by Formula 6.

$$(i,j,k)=(Yc1Zc2-Yc2Zc1,Zc1Xc2-Zc2Xc1,Xc1Yc2-Xc2Yc1) \quad \text{(Formula 6)}$$

Herein, since the plane of visual ray for edge $P_2$ has a fixed point of the coordinate origin (optical center) (0, 0, 0), the plane of visual ray for edge can be represented based on the normal vector (i, j, k) by Formula 7.

$$ix+jy+kz=0 \quad \text{(Formula 7)}$$

The second edges $e_1$ and $e_3$ exist at three-dimensional positions on the plane of visual ray for edge. Further since the second edges exist on the same plane as that of the first edges $e_1$ and $e_3$, they can be said to exist at three-dimensional positions on the bounded plane.

Accordingly the arithmetic unit 102 calculates a cross line $E_3$ between the plane of visual ray for edge $P_2$ and the bounded plane $P_1$, and sets the cross line $E_3$ as the three-dimensional position of the second edges (S12).

That is, the directional vector (Xe, Ye, Ze) of the cross line $E_3$ between the plane of visual ray for edge $P_2$ and the bounded plane $P_1$ can be represented by the outer product of the normal vector (a, b, c) of the bounded plane $P_1$ and the normal vector (i, j, k) of the plane of visual ray for edge $P_2$, which can be represented by Formula 8.

$$(Xe,Ye,Ze)=(bk-cj,ci-ak,aj-bi) \quad \text{(Formula 8)}$$

Further since any fixed point (Xp, Yp, Zp) where the cross line $E_3$ passes through satisfies both of the formula for the bounded plane $P_1$ and the formula for the plane of visual ray for edge $P_2$, the arithmetic unit 102 calculates this fixed point (Xp, Yp, Zp) by finding the solution of the simultaneous equation of the above Formulae 5 and 7.

In the simultaneous equation of the above Formulae 5 and 7, unless Ze=0, x and y can be found by setting Z=0, and therefore the fixed point (Xp, Yp, Zp) can be represented by Formula 9 using the formula of the bounded plane, the formula of the plane of visual ray for edge and Z=0.

$$(Xp,Yp,Zp)=((ax3+by3+cz3)j)/Ze,(ax3+by3+cz3)i)/(-Ze),0) \quad \text{(Formula 9)}$$

Thereby, the cross line $E_3$ can be represented by Formula 10 using the directional vector (Xe, Ye, Ze) and the fixed point (Xp, Yp, Zp). Then, the arithmetic unit 102 finds the solution of Formula 10 and sets the same as the three-dimensional position of the second edge $e_3$ (S12).

$$(x-Xp)/Xe=(y-Yp)/Ye=(z-Zp)/Ze \quad \text{(Formula 10)}$$

The arithmetic unit 102 three-dimensionally restores the first edges and the second edges, and then recognizes the three-dimensional position of the work W using the thus three-dimensional restored first and second edges $E_2$, $E_4$ and $E_3$ (S13).

More specifically, firstly, the arithmetic unit 102 finds a cross point among the three-dimensionally restored second edge $E_3$ (the formula of three-dimensional straight-line of the second edge) and the three-dimensionally restored first edges $E_2$ and $E_4$ (the Formula of three-dimensional straight-line of the first edge). Then, using three points including the thus found cross point, one point of the three-dimensionally restored first edges $E_2$ and $E_4$ and one point of the three-dimensionally restored second edge $E_3$, a posture position of the work is represented by setting a corner of the work as a starting point.

In this way, the bounded plane $P_1$ is created using the first edges $e_2$ and $e_4$ having good accuracy for stereo restoring, i.e., having large cross angles with respect to the epipolar line EP. Then, the second edges $e_1$ and $e_3$ on the same plane having small cross angles with respect to the epipolar line EP are projected on this bounded plane $P_1$. Thereby, three-dimensional restoring is enabled even for the second edges $e_1$ and $e_3$ having small angles with respect to the epipolar line.

Further the area position of edges T may be stored together with the template image $G_T$, and edges on the same plane may be selected using pattern matching. Thereby, the edges on the same plane can be quickly and accurately specified.

Note here that, although edges on a straight line only are selected in the present embodiment, they may not be always edges on a straight line. Further, the work may be taken by three or more cameras, and two images may be selected from the plurality of taken images.

Further, the edges on the same plane may be detected by any method other than pattern matching. For instance, the edges may be detected by a detection method using amounts of characteristics on edges, for example, such that the amounts of characteristics such as weighted centers, angles, edge strengths and lengths of the edges on the same plane are stored beforehand based on a reference image, and edges similar to these amount of characteristics are selected.

Moreover, the three-dimensional measurement method according to the present invention is not limited for robot devices only and is applicable to any device of recognizing a target using an image such as a three-dimensional shape measurement device or a collision avoidance device for vehicles. Needless to say, the invention described in the present embodiment may be combined in any way for use.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-281150, filed Dec. 22, 2011, which is hereby incorporated by reference herein in its entirety.

REFERENCE SIGNS LIST

3a: first camera
3b: second camera
102: arithmetic unit
W: work
$G_E$, $G_{E1}$: stereo image
e: edge
$e_2$, $e_4$: first edge
$e_1$, $e_3$: second edge
EP: epipolar line
$P_1$: three-dimensional plane (bounded plane)

The invention claimed is:

1. Three-dimensional measurement method, comprising the steps of:
   acquiring, by an arithmetic unit, a stereo image of a work taken by first and second cameras;
   extracting, by the arithmetic unit, edges from the acquired stereo image;
   selecting, by the arithmetic unit, edges existing on a same plane of the work from the edges extracted on the stereo image;
   three-dimensionally restoring, by the arithmetic unit, at least two first edges among the edges existing on the same plane by a stereo method, the first edges residing in a predetermined angle range with reference to a cross angle of 90° made by crossing with an epipolar line;
   calculating, by the arithmetic unit, a three-dimensional plane including the three-dimensionally restored first edges using the three-dimensionally restored at least two first edges; and
   three-dimensionally restoring, by the arithmetic unit, a second edge among the edges existing on the same plane as the first edges by projecting the second edge on the three-dimensional plane, the second edge residing beyond a predetermined angle range with reference to a cross angle of 90° made by crossing with an epipolar line.

2. The three-dimensional measurement method according to claim 1, wherein the arithmetic unit selects the edges existing on the same plane by performing pattern matching using a template image with respect to the stereo image.

3. The three-dimensional measurement method according to claim 1, wherein the first edge is an edge among the extracted edges having a cross angle of the edge with the epipolar line of 45° or more and 135° or less.

4. The three-dimensional measurement method according to claim 1, wherein the first edge is an edge among the extracted edges having a cross angle of the edge with the epipolar line of 20° or more and 160° or less.

5. The three-dimensional measurement method according to claim 1, the work is further taken by a third camera, and two images are selected from a plurality of images taken by the first, the second and the third cameras to acquire a stereo image.

6. A non-transitory computer-readable medium storing a three-dimensional measurement program that makes a computer execute the steps according to claim 1.

7. A robot device, comprising:
   first and second cameras that take an image of a work;
   a robot arm that performs an operation to the work; and
   an arithmetic unit that recognizes a three-dimensional position of the work based on the stereo image of the work taken by the first and the second cameras and gives a driving instruction to the robot arm,
   wherein
   the arithmetic unit extracts edges from the acquired stereo image, selects edges existing on a same plane of the work from the extracted edges, three-dimensionally restores at least two first edges among the edges existing on the same plane by a stereo method, the first edges residing in a predetermined angle range with reference to a cross angle of 90° made by crossing with an epipolar line, three-dimensionally restores a second edge by projecting the second edge on a three-dimensional plane including the three-dimensionally restored first edges, the second edge residing beyond a predetermined angle range with reference to a cross angle of 90° made by crossing with an epipolar line, and recognizes a three-dimensional position of the work using the three-dimensionally restored first and second edges.

* * * * *